United States Patent
Haas et al.

(10) Patent No.: US 6,831,537 B2
(45) Date of Patent: Dec. 14, 2004

(54) DEVICE FOR DETECTING THE FITTING OF A CHILD'S SEAT

(75) Inventors: Lothar Haas, Rosstal (DE); Adam Hirt, Ammerdorf (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 10/333,343

(22) PCT Filed: Jul. 18, 2001

(86) PCT No.: PCT/DE01/02703

§ 371 (c)(1),
(2), (4) Date: Jan. 17, 2003

(87) PCT Pub. No.: WO02/09981

PCT Pub. Date: Feb. 7, 2002

(65) Prior Publication Data

US 2003/0160670 A1 Aug. 28, 2003

(30) Foreign Application Priority Data

Jul. 28, 2000 (DE) .......................... 100 36 933

(51) Int. Cl.⁷ ................................. H01H 9/00
(52) U.S. Cl. .................. 335/207; 335/205; 280/735
(58) Field of Search ................. 335/205–207, 335/151–153; 280/734, 735; 180/273

(56) References Cited

U.S. PATENT DOCUMENTS

| | | | | |
|---|---|---|---|---|
| 4,061,988 A | * | 12/1977 | Lewandowski | ........... 338/32 H |
| 5,515,933 A | * | 5/1996 | Meyer et al. | ................ 180/273 |
| 5,678,854 A | * | 10/1997 | Meister et al. | .............. 280/735 |
| 5,690,356 A | | 11/1997 | Lane | |
| 5,851,025 A | * | 12/1998 | Gamboa | ...................... 280/735 |
| 6,007,093 A | * | 12/1999 | Bechtle et al. | .............. 280/735 |
| 6,205,629 B1 | * | 3/2001 | Becker | ......................... 24/633 |
| 6,329,893 B1 | * | 12/2001 | Furukawa et al. | .......... 335/205 |
| 6,457,545 B1 | * | 10/2002 | Michaud et al. | ............ 180/272 |
| 6,522,257 B1 | * | 2/2003 | Jakob et al. | ............. 340/686.1 |
| 2003/0010011 A1 | * | 1/2003 | Meyer et al. | ................. 57/417 |

FOREIGN PATENT DOCUMENTS

| | | |
|---|---|---|
| DE | 198 27 057 A1 | 12/1999 |
| EP | 0 650 869 A | 5/1995 |
| EP | 0 650 869 A1 | 5/1995 |
| WO | 96/26527 | 8/1996 |
| WO | 96 26527 A | 8/1996 |

* cited by examiner

Primary Examiner—Lincoln Donovan
Assistant Examiner—Bernard Rojas
(74) Attorney, Agent, or Firm—Michael J. Striker

(57) ABSTRACT

A device for detecting the installation of a child seat, in particular on a vehicle seat, includes one fixed part and one movable mechanism. The fixed part has a switch element with two switching states and a device for forming an actuating field for the switch element. The movable mechanism is movable, as a result of the installation of the child seat, from a first position to a second position, thereby making a variation in the actuating field attainable, so that the switch element changes the switching state.

16 Claims, 8 Drawing Sheets

DEVICE FOR DETECTING THE FITTING OF A CHILD'S SEAT

BACKGROUND OF THE INVENTION

The invention relates to a device for detecting the installation of a child seat.

In vehicles that are equipped with an air bag on the passenger side or on the floor, the problem arises that whenever a child seat is installed there, tripping the air bag can cause injuries to the child in the child seat. It is therefore desirable for the installation of a child seat on applicable vehicle seat to be detected automatically.

SUMMARY OF THE INVENTION

According to the invention, a device for detecting the installation of a child seat, in particular on a vehicle seat, with one fixed part and one movable mechanism is furnished, in which the fixed part has a switch element with two switching states and means for forming an actuating field for the switch element, and the movable mechanism is movable as a result of the installation of a child seat from a first position to a second position, thus making a variation in the actuating field attainable, causing the switch element to change its switching state.

The device has the advantage that the switch element can be tripped reliably by the movable mechanism, and the movable mechanism is quite simple in design. In particular, field forming means and the switch element are disposed on the fixed part and can thus be [sic] reliably and in simple way on one another and are not subject to any motions whatever during operation. By means of the switch element, a signal can be switched that reminds the driver that the child seat has been installed, or sends information to the air bag controller as a result of which the applicable air bag is deactivated.

An embodiment in which the field is a magnetic field and the switch element is a magnetic switch element is especially advantageous. A magnetic field can be generated especially simply by means of a permanent magnet, in other words without supplying any energy whatever. The switching operation is also especially fast and reliable because of the use of a magnetic switch.

For varying the actuating magnetic field, a shielding means, in particular a sheet of soft iron, can advantageously be provided, which is located in the first position in a region between the magnetic switch element and the magnet and in the second position at least partly outside that region. In the first position, the shielding means short-circuits the actuating magnetic field. Because of its conductivity, a sheet of soft iron is especially well suited for this purpose. A shielding means for the actuating magnetic field represents an especially simple, reliable way of actuating the magnetic switch.

The magnetic switch element can have a so-called Reed switch. An embodiment by means of a Hall sensor is also conceivable.

Alternatively, the actuating field can also be an electromagnetic field, of the kind generated by a light source, for instance. The switch element in that case has a radiation detector, such as a photoelectric element.

In order to return the switch to its outset switching position again when the child seat is removed, means for restoring the movable mechanism to the first position can be provided.

In a variant of the invention, the movable mechanism is supported rotatably about a pivot point on the fixed part, and the shielding means is secured to the movable mechanism. In this variant, when the child seat is installed, the shielding means is pivoted from the first position, in which it shields the actuating magnetic field from the magnetic switch, into the second position, in which it at least partly uncovers the actuating magnetic field.

To achieve especially effective shielding, in this variant the shielding means can be deformed on at least one side in such a way that in the first position, it at least partly embraces one pole of the magnet.

If one edge of the shielding means is chamfered toward the pivot point, then particularly precise switching of the magnetic switch can be achieved.

It is also advantageous if the fixed part on its underside has a dirt removal slot, which is at least partly engaged by the shielding means. Then dirt, which over the course of time gets into the device and collects on its underside, can be moved out of the device by the moving shielding means.

The restoring means, in the first variant, can have a torsion spring that is disposed coaxially with the movable mechanism.

In another variant, the movable mechanism has one rotatable part and one displaceable part, and the rotatable part is supported rotatably about a pivot point on the fixed part, and the displaceable part has the shielding means, and the displaceable part is displaceable from the first position to the second position by means of a cam that is located on the rotatable part. This variant can be made in an especially space-saving form.

In this variant, the restoring means can have [sic] which acts on the displaceable part, and/or can have a torsion spring which is disposed coaxially with the rotatable part and acts on it.

In both variants, the fixed part can have two housing halves, which are preferably provided with a number of fixation pins and associated openings for radial fixation of the two housing halves relative to one another.

The two housing halves can also have positive-displacement dogs and associated openings for axially fixing the housing halves relative to one another.

According to the invention, the magnetic switch element can be designed for switching a signal for an air bag controller. This makes it possible to attain an automatic shutoff of the air bag controller in the event that an installed child seat is detected.

It is especially advantageous if the movable mechanism has a lever that is movable by means of a locking device of the child seat. A locking device of this kind is present in any case in certain child seats, so that those child seats require no modification.

It is also advantageous if means for securing in the vehicle seat on a crossbar, in particular in accordance with ISO standard 13216-1 ("ISOFix") are provided.

The invention further includes a vehicle seat that has at least one of the above-described detecting devices.

BRIEF DESCRIPTION OF THE DRAWINGS

The invention will be described in terms of two exemplary embodiments and in conjunction with the drawing. Shown in the drawing are.

DETAILED DESCRIPTION OF THE PREFERRED EMBODIMENTS

Figure 1A:
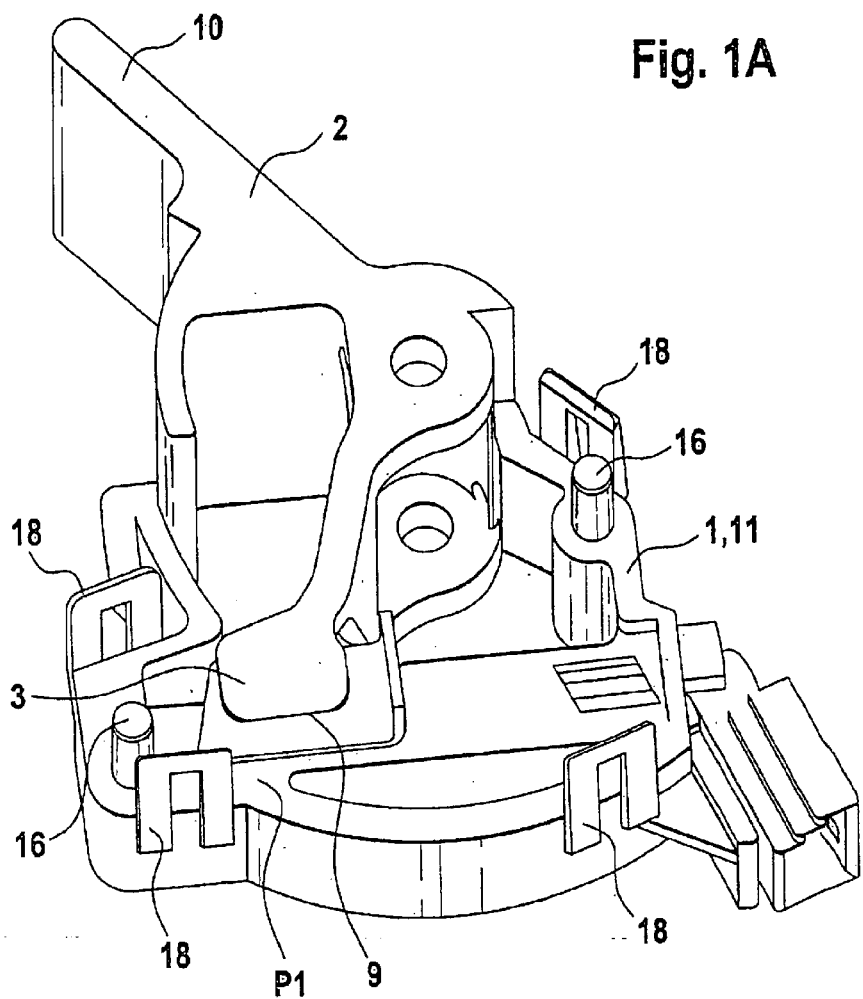
FIGS. 1, 2, fragmentary views of the first variant.
Figure 1B:
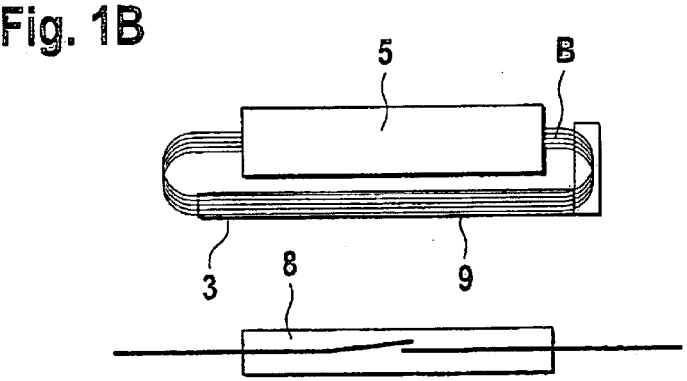

The perspective view in FIG. 1A shows the first variant of the invention with a housing half 12 of the fixed part 1 removed. The movable mechanism 2, 3, with shielding means 3 and a lever 10, is disposed in the first housing half 11 and supported rotatably at the pivot point 7 and is located in the first position P1. In the first position P1, the shielding means 3, which is a sheet of soft iron, is located in the region 9 between magnet 5 and magnetic switch element 8 (FIG. 1B) and thus shields the actuating magnetic field 5, so that the magnetic switch element 8 will not be penetrated by the magnetic field B of the magnet 5. The switching state of the magnetic switch element 8 represents the situation that can be referred to as "no child seat installed". A Reed switch is used as the magnetic switch element 8.

Figure 2:
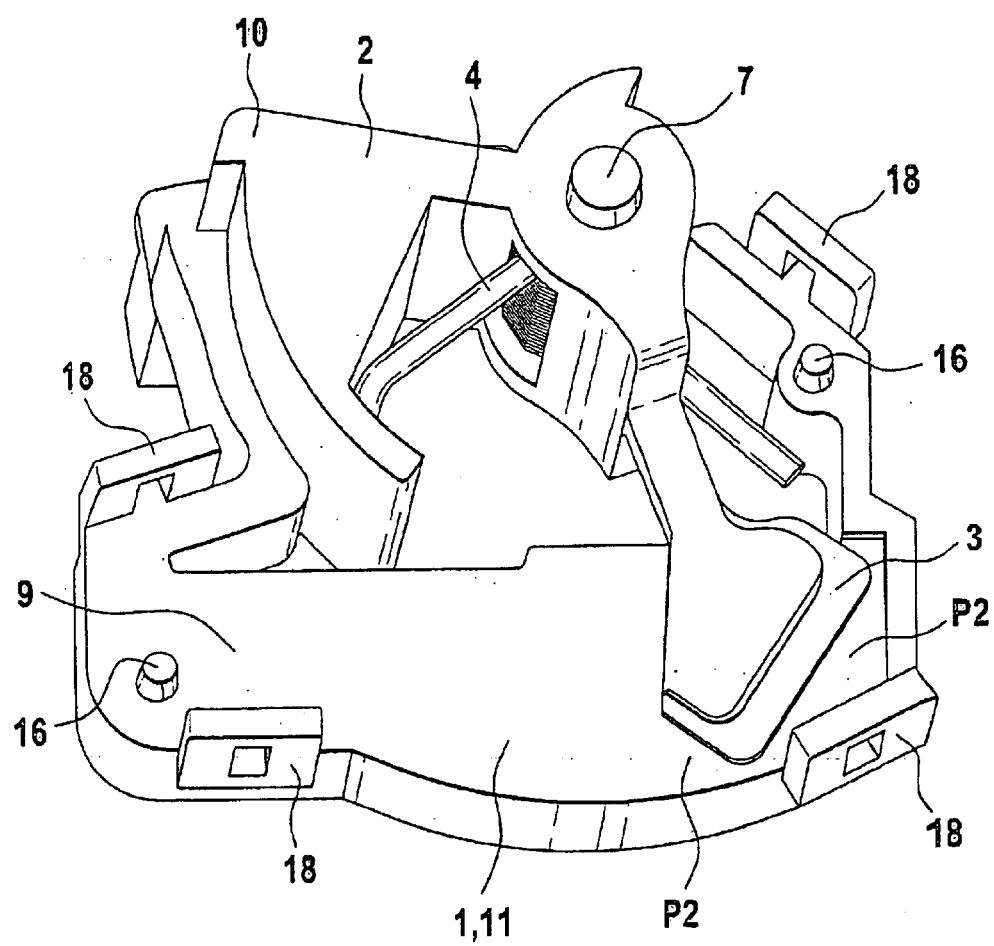

In the perspective view of FIG. 2, the movable mechanism 2, 3 is in its second position P2. Here, the shielding baffle 3 has been pivoted out of the region 9 between the magnet 5 and the magnetic switch element 8, specifically counter to the restoring force of the restoring means 4, which here is designed as a torsion spring. The torsion spring 4 is disposed coaxially to the movable mechanism 2, 3. The maximum deflection of the lever 10 is limited by means of a stop on the housing half 11. The magnetic field can thus penetrate the magnetic switch element, causing the latter to change its switching state. As a result, an electrical signal that represents the situation "child seat installed" is switched.

Figure 3:
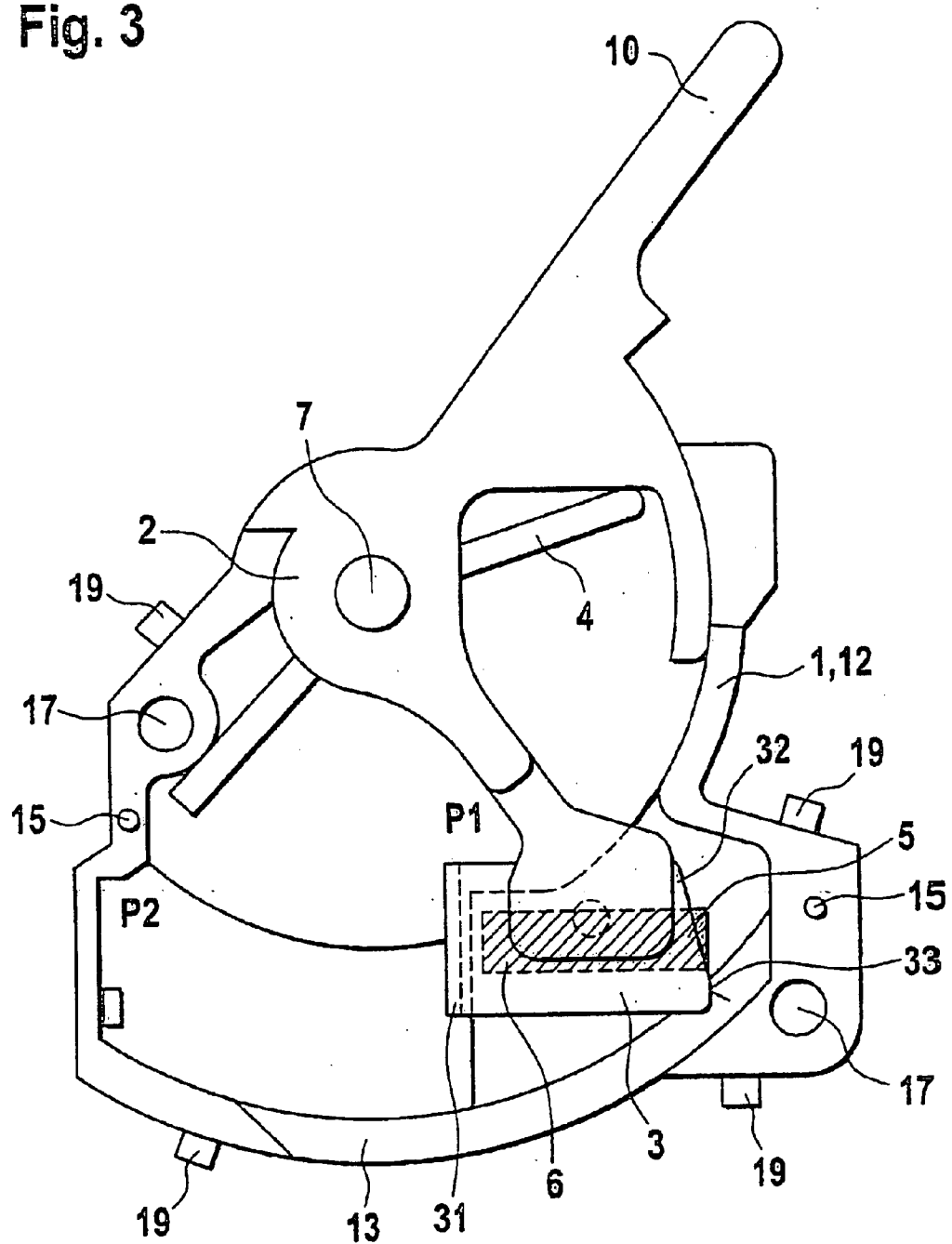
FIG. 3, a sectional view of the first variant.

FIG. 3 shows further details of the detection device in accordance with the first variant. It shows a sectional view in the position P1 of FIG. 1, but seen from the back. The housing half 12 is located in the background. The shielding baffle 3 is bent over to the rear (into the plane of the drawing) on one face end 31, so that in the position P1 it surrounds the magnet 5 at one pole 6. As a result, especially effective shielding of the magnetic field is achieved. So that the magnetic switch element, when the shielding baffle 3 pivots out of the way, will switch particularly precisely, its rear edge 32 is chamfered toward the pivot point 7.

On the underside, between the two housing halves 11, 12, a slot 13 is provided, through which dirt that gets into the housing can be removed. The cleaning effect is enhanced still further by providing that the shielding baffle 3 engages this slot 13 with one corner 33 and slides along it in its motion between the two positions P1, P2.

Figure 4:
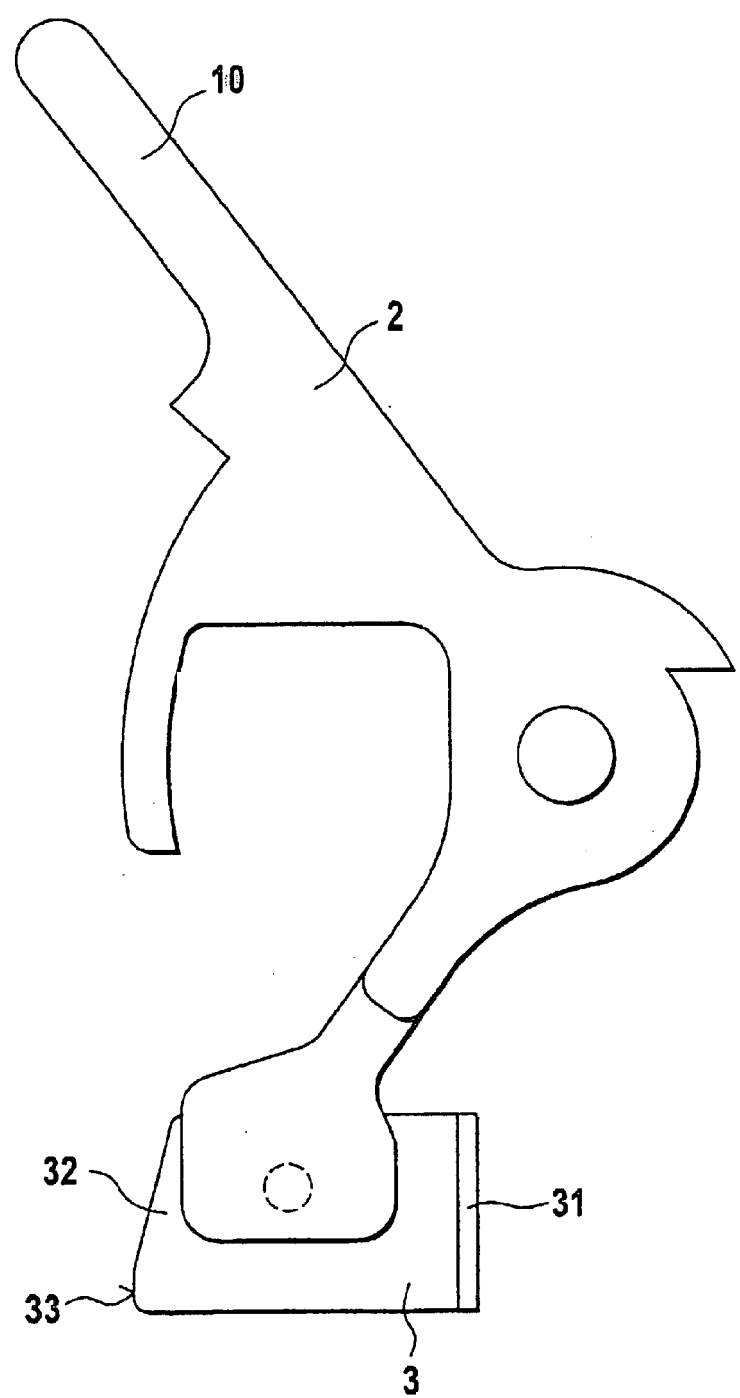
FIG. 4, the movable mechanism of the first variant.

FIG. 4 shows the movable mechanism 2, 3, 10 of the first variant from behind. The side 31 of the shielding baffle has been bent at an angle toward the front.

Figure 5:
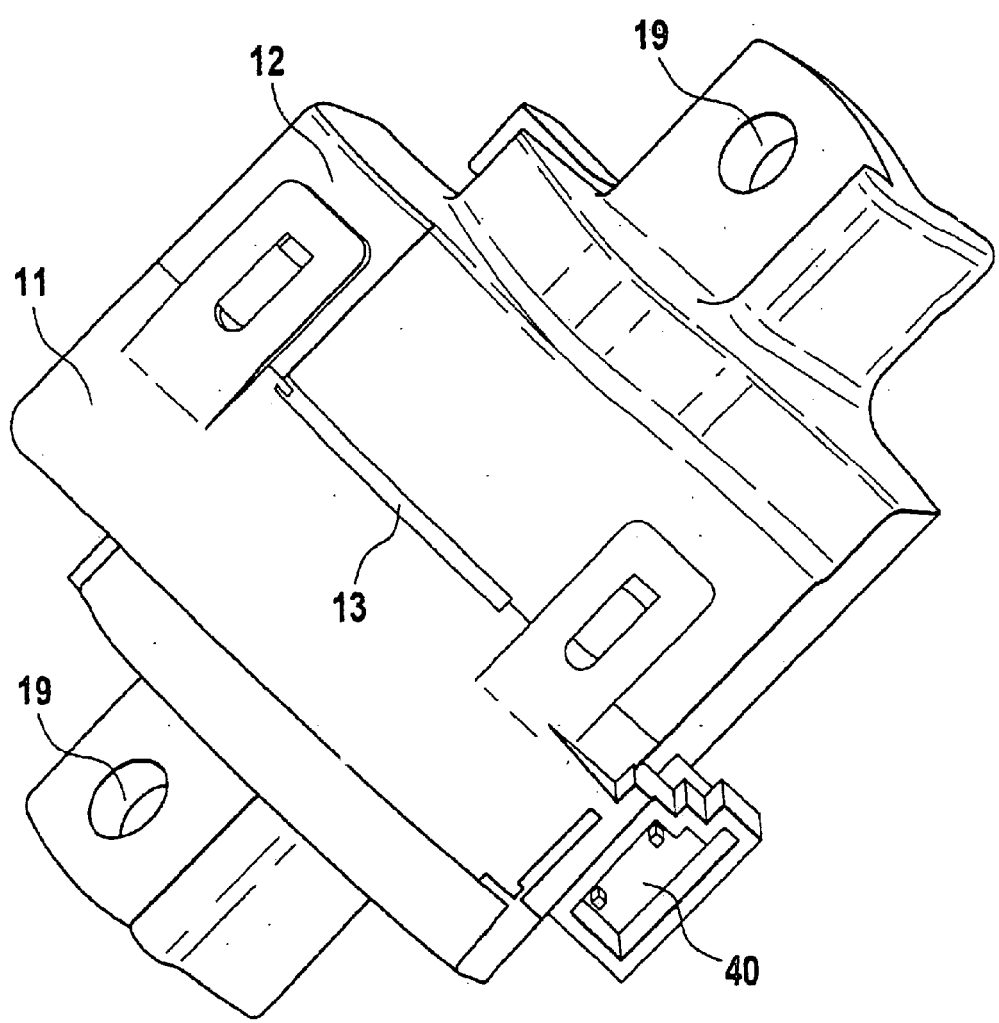
FIG. 5, a view from outside and below on the housing of the first variant.

In the outside view from below in FIG. 5, the slot 13 is shown. An electrical terminal 40 is also provided, by way of which the magnetic switch element 8 is connected to the air bag controller.

In the first variant of the invention described above, the movable mechanism 2, 3 is rotated via the lever 10, as a result of which the shielding means 3 is pivoted out of the actuating magnetic field.

Figure 6:
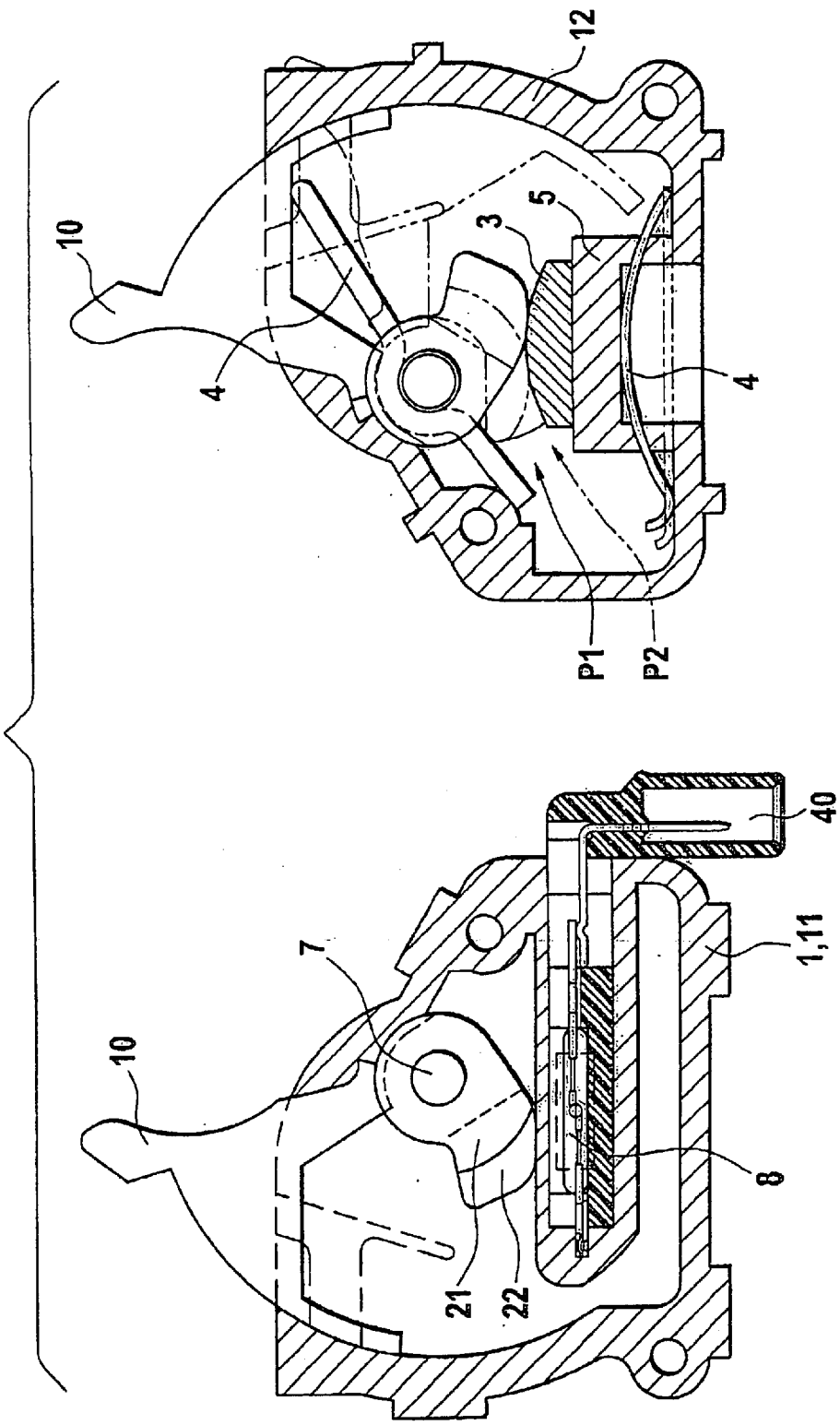
FIG. 6, a sectional view of the second variant.

In the second variant of the invention shown in FIG. 6, the movable mechanism 2, 3 has one rotatable part 2 and one displaceable part 3. The rotatable part 2 includes the lever 10 and a cam 21, which acts on the shielding baffle 3 that is supported on the displaceable part 3. The rotary motion of the lever 10 is accordingly converted into a translational motion of the shielding baffle 3. In the position of repose, the shielding baffle 3 is forced by the hoop spring 4 into the region 9 between the magnet 5 and the magnetic switch 8. In addition, here as well a torsion spring is provided as a restoring means 4 for the rotatable part 2.

Upon deflection by the lever 10, the shielding baffle 3 is forced downward out of the position P1, counter to the spring stress, out of the actuating magnetic field into the position P2.

The cam 21 has a control curve 22, which assures especially fast switching of the magnetic switch element 8.

Figure 7:
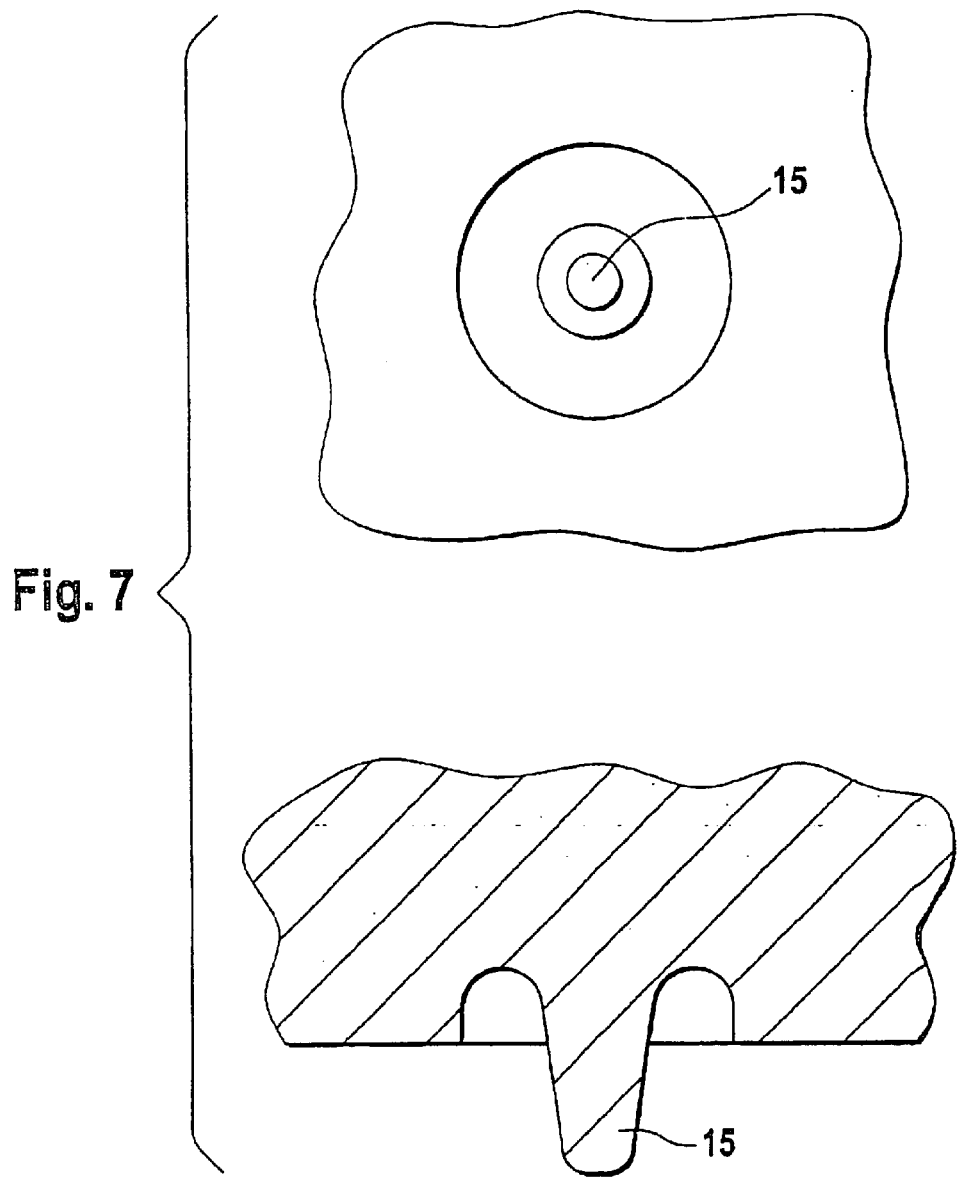
FIG. 7, a detail of the housing.

For both variants, the housing is designed such that it can be put together by simply snapping the two housing halves 11, 12 together. To that end, detent means 18, 19 (FIGS. 1-3) are provided. For fixing the two housing halves 11, 12 radially to one another, a number of fixation pins 16 and associated openings 17 are provided. As shown in FIG. 7, the fixation pins 16 each taper slightly conically (by about 3 to 5°). For axial fixation of the housing halves 11, 12 relative to one another, positive-displacement dogs 15 are provided, which assure a tolerance compensation of the two housing halves 11, 12. In terms of tolerances, the detector is designed such that dirt particles larger than 0.5 mm cannot get into the housing interior from above or from the side.

The detection device according to the invention can be built into a vehicle seat. In accordance with ISO standard 13216-1 ("ISOFix"), the seat has a crossbar between the backrest and the seating surface, and a pair of fastening clips for a child seat 200 are located on this crossbar. The detection device of the invention is likewise secured in pairs to the fastening clips by means of fastening devices 19.

Figure 8:
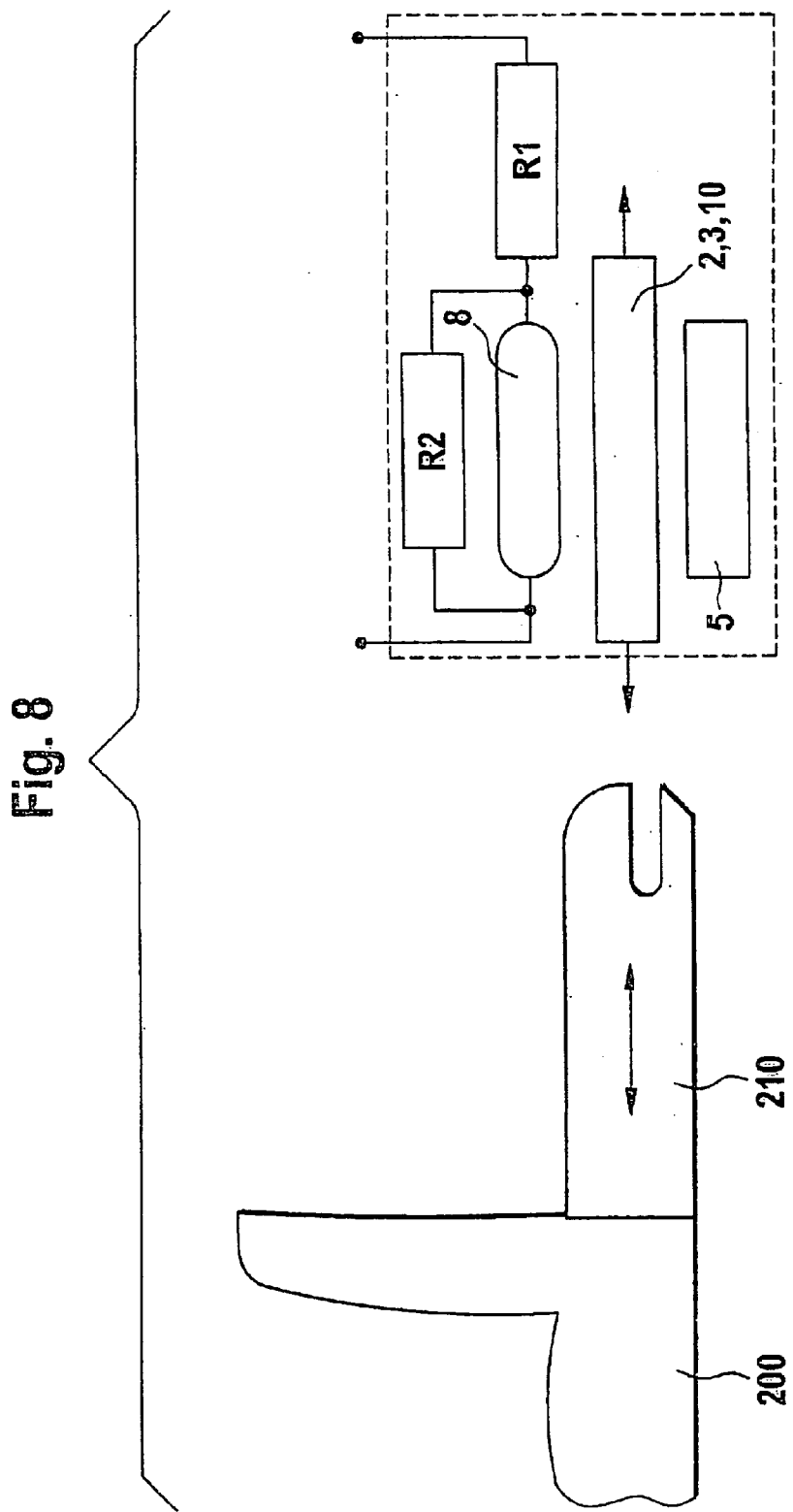
FIG. 8, a diagram illustrating the principle of operation.

FIG. 8 summarizes the principle of operation of the detection device of the invention. If the child seat 200 is thrust into the fastening clips by means of a pair of locking devices 210, then the lever 10 of the detection device of the invention is moved into the second position P2, and thus the remainder of the movable mechanism 2, 3 is moved into that position as well, so that because of the change in field the magnetic switch 8 changes its switching state. As a result, a signal can be switched that provides the air bag controller with the information that the air bag tripper should be deactivated. The wiring of the magnetic switch 8 can be embodied as represented in the drawing by the two resistors R1, R2.

Since the detection device is present in pairs, the detection operation can be performed redundantly, which further increases the reliability and hence enhances the safety of the child in the child seat.

Since the detection device is mounted on the fastening hoop for the child seat 200, additional precautions at the child seat and vehicle seat can be dispensed with, making the invention especially economical to realize.

The variation in the magnetic field is not limited to the case of shielding. A variation by means of materials with predetermined different magnetic properties is also possible.

Hall sensors can also be used in the switch elements 8. Other kinds of actuating fields B include electromagnetic fields, which then act on corresponding sensors as switch elements 8. An embodiment with a light source functions on the principle of a photoelectric gate.

The invention is moreover not limited to detecting an installed child seat. It is also conceivable for the detection device to be used anywhere that it is important to detect a seat assembly or other built-in part in particular positions.

What is claimed is:

1. A device for detecting the installation of a child seat (200) on a vehicle seat (100), comprising:
    a fixed part (1, 11, 12); and
    a movable mechanism (2, 3),
    wherein the fixed part (1, 11, 12) has a switch element (8) with two switching states and means (5) for forming an actuating field (B) for the switch element (8), and
    wherein the movable mechanism (2, 3) is movable from a first position (P1) to a second position (P2) as a result of the installation of a child seat (200), and by that means a variation in the actuating field (B) is attainable, so that the switch element (8) changes its switching state; and
    wherein for varying the actuating field (B), a shielding means (3) in the form of a sheet of soft iron is provided, wherein the sheet of soft iron is located in a region (9) between the switch element (8) and the forming means (5) in the first position (P1) and in the second position (P2) is located at least partly outside the region (9).

2. The device of claim 1, wherein the field (B) is a magnetic field and the switch element (8) is a magnetic switch element.

3. The device of claim 1, wherein the switch element (8) has a Reed switch or a Hall sensor.

4. The device of claim 1, wherein means (4) for restoring the movable mechanism (2, 3) to the first position (P1) are provided.

5. The device of claim 1, wherein the movable mechanism (2, 3) is supported on the fixed part (1, 11, 12) rotatably about a pivot point (7), and the shielding means (3) is secured to the movable mechanism (2, 3).

6. The device of claim 1, wherein the shielding means (3), on at least one side (31), is shaped such that in the first position (P1), the shielding means at least partly embraces one pole (6) of the magnet (5).

7. The device of claim 1, wherein one edge (32) of the shielding means (3) is chamfered toward the pivot point (7).

8. The device of claim 1, wherein the fixed part (1, 11, 12), on the underside, has a dirt removal slot (13), the inside of which is at least partly engaged by the shielding means (3).

9. The device of claim 4, wherein the restoring means (4) have a torsion spring, wherein said torsion spring is disposed coaxially with the movable mechanism (2, 3).

10. The device of claim 1, wherein the movable mechanism (2, 3) has one rotatable part (2) and one displaceable part (3), and the rotatable part (2) is supported rotatably about a pivot point (7) on the fixed part (1, 11, 12), and the displaceable part has the shielding means (3), and the displaceable part (3) is displaceable from the first position (P1) to the second position (P2) by means of a cam (21) that is located on the rotatable part (2).

11. The device of claim 4, wherein the restoring means (4) have a hoop spring, wherein said hoop spring acts on the displaceable part (3), and/or a torsion spring, wherein said torsion spring is disposed coaxially with the rotatable part (2) and acts on it.

12. The device of claim 1, wherein the fixed part (1, 11, 12) has two housing halves with a number of fixation pins (16) and associated openings (17) for radial fixation of the two housing halves (11, 12) relative to one another.

13. The device of claim 12, wherein the two housing halves (11, 12) have positive-displacement dogs for axial tolerance compensation of the housing halves (11, 12) to one another.

14. The device of claim 1, wherein the magnetic switch element (8) is designed for switching a signal for an air bag controller.

15. The device of claim 1, wherein the movable mechanism (2, 3) is movable via a lever (10) by means of a locking device (210) of the child seat (200).

16. A vehicle seat (100) having at least one device of claim 1.

* * * * *